Jan. 13, 1931.  E. M. BARKER  1,788,940
COLLAPSIBLE AUTOMOBILE CLOSURE
Filed July 23, 1928   2 Sheets-Sheet 1
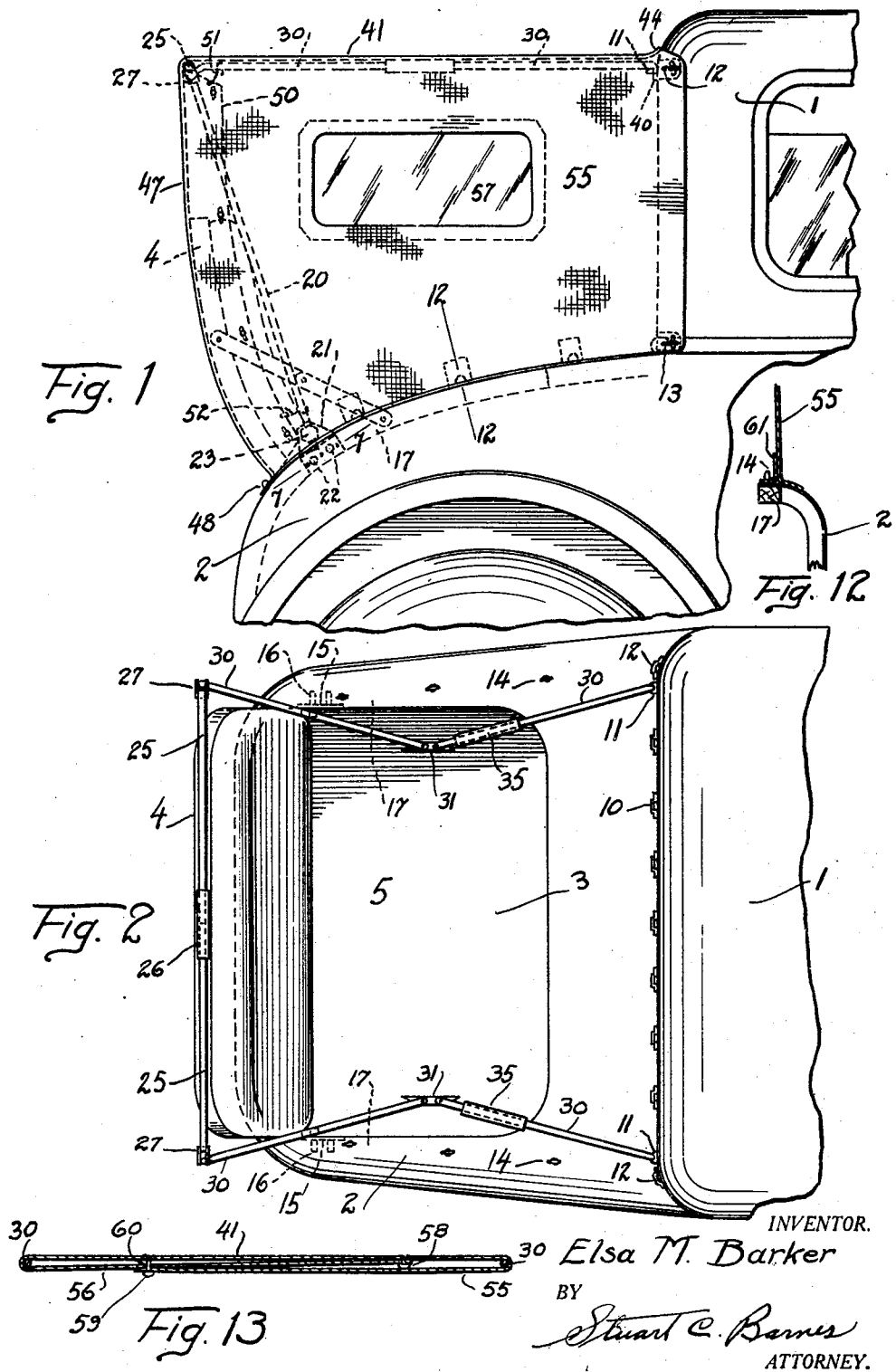
INVENTOR.
Elsa M. Barker
BY
Stuart C. Barnes
ATTORNEY.

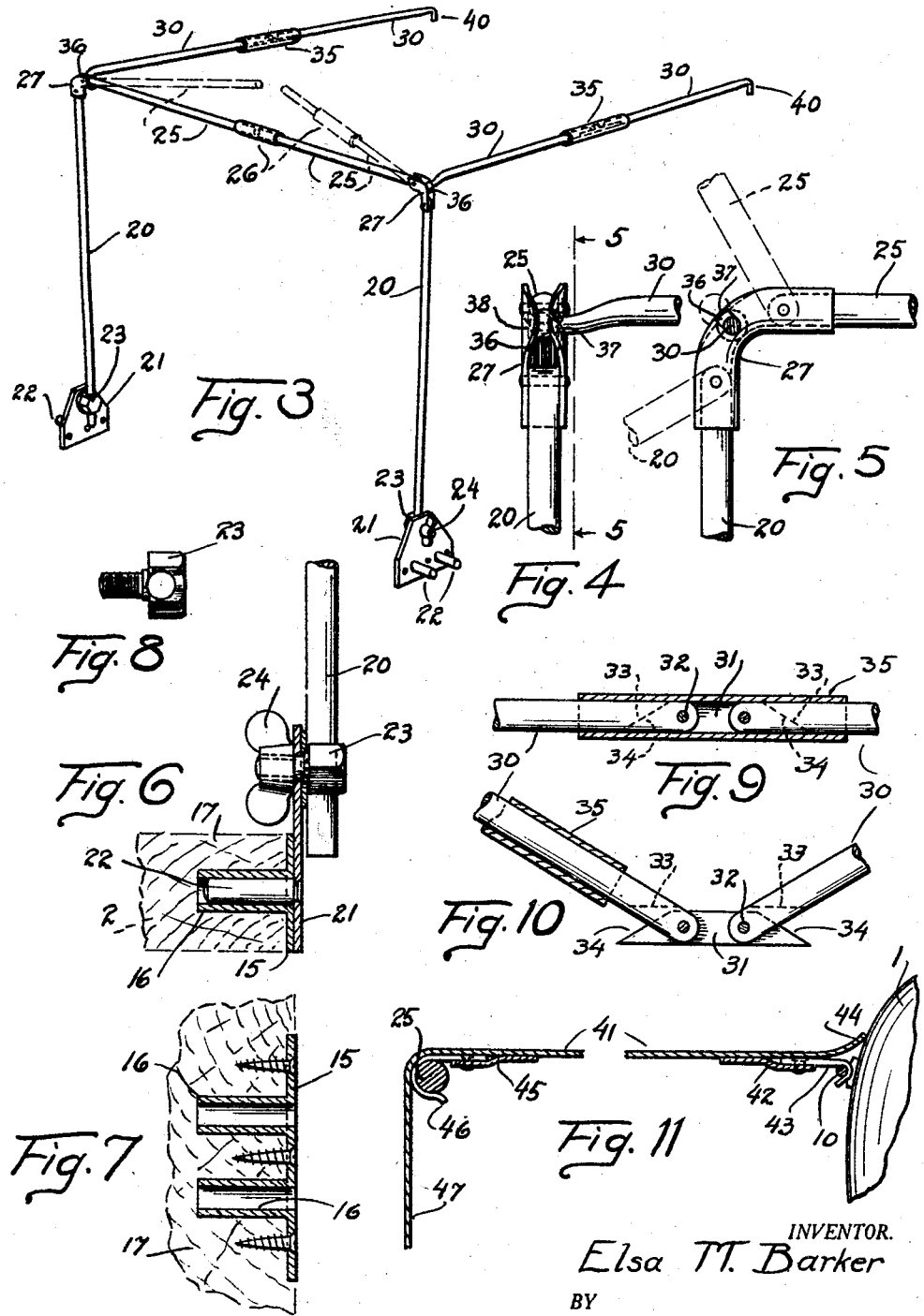

Patented Jan. 13, 1931

1,788,940

UNITED STATES PATENT OFFICE

ELSA M. BARKER, OF DETROIT, MICHIGAN

COLLAPSIBLE AUTOMOBILE CLOSURE

Application filed July 23, 1928. Serial No. 294,664.

The subject matter of this invention resides in a collapsible closure for the rumble seat of an automobile of the type often termed a sport coupé or sport roadster. Such automobiles employ a single seat for two or three passengers with a rear compartment enclosed by a suitable deck which has a closure which opens up so that other passengers can be seated in the compartment with the closure forming a back seat.

The invention contemplates an improved construction embodying a frame work which can be easily set up or collapsed so that it can be stored away in the car when not in use. In conjunction with the frame work is a covering of suitable material, such as canvas, which the frame work supports, and this cover can also be easily put into place or folded up for storage. The arrangements of various parts of the structure are such that the same can be set up or taken down by the occupants in the rumble seat.

In the accompanying drawings:

Fig. 1 is a side elevational view of an automobile with a closure constructed in accordance with the invention applied thereto.

Fig. 2 is a top plan view showing the frame structure and illustrating the same in partially collapsed position.

Fig. 3 is a perspective view of the frame structure.

Fig. 4 is a detail of the corner construction of the frame.

Fig. 5 is a view taken substantially on line 5—5 of Fig. 4, showing the corner construction.

Fig. 6 is a sectional view taken through a portion of the automobile body illustrating how the frame is connected thereto.

Fig. 7 is a similar section taken on line 7—7 of Fig. 1.

Fig. 8 is a detail of one of the members used for mounting the frame structure.

Figs. 9 and 10 are views illustrating a joint structure which is used in the frame.

Fig. 11 is a detail view in section illustrating the mounting of the cover.

Fig. 12 is a detail section on line 12—12 of Fig. 1.

Fig. 13 is a sectional view taken through the top of the cover illustrating the curtain arrangement.

In the accompanying drawings there is shown in Fig. 1 the rear portion of an automobile having a closed body portion 1 of the coupé type, with a rear deck 2 provided with a compartment 3. The top portion 4 of this deck is hinged so that it can be opened as shown to provide a back rest for occupants utilizing seat 5 within the compartment. Such an arrangement is commonly termed a rumble seat and is used rather extensively at the present time on automobiles of the type mentioned.

For the purpose of providing a closure for the protection of the occupants of this seat, the fixed closure 1 of an automobile may be provided with a plurality of fastening devices such as loops 10, a pair of eye members 11, and loops 12, and the lower portion of the closure 1 may be provided with loops 13 which may be similar to the loops 12. The deck of the automobile, on each side of the deck opening, is preferably provided with a row of fasteners 14 which may be of any suitable type and which may advantageously be of the rotating head type for the fastening of a grommet.

Within the compartment opening at each side of the opening, the automobile is provided with fastening devices each of which may take the form of a plate 15 having tubular extensions 16, with the plate and tubular extensions embedded in the automobile frame member 17 so that the plate lies flush with the edge of the compartment opening.

The collapsing frame structure for the closure, as shown in Fig. 3, consists of two uprights 20 each provided with plate 21 having studs 22. The uprights are preferably adjustable as regards to height, and for this purpose each upright may be secured to its plate by means of an apertured bolt 23 through which the end of the upright extends, and which bolt may be tightened by a wing nut 24. It will be noted, therefore, that the uprights can be shifted and adjusted vertically and angularly by rotation of the bolt which extends through the plate 21. When the wing nut is tightened the upright members are drawn tightly against the plate as shown in Fig. 6 so that it is held in proper position.

Each upright has hinged thereto, at its upper end, the cross piece 25, and the two cross pieces may be placed end to end and held in proper position by a sliding sleeve 26. The manner in which the upright and cross piece are hinged together is illustrated in Figs. 4 and 5 which includes an angular member 27 to which each is pivoted. This member is preferably of open channel formation with the channel opening upwardly. Accordingly, the members 20 and 25 can be folded up by pivoting the same outwardly as regards the angle between them, as illustrated by the dotted lines in Fig. 5, and when the frame is set up the member 27 positively fixes the angle which may be substantially a right angle between the cross member 20 and cross member 25.

These two uprights are fitted to the car in a position as shown in Fig. 1, with the studs 22 fitting in the extensions 16. With the frame in position as shown in Fig. 3, the corner members 27 prevent upright 20 from inwardly collapsing and the normal distance between the two plates 21 may be greater than the transverse distance across the closure 5, so that, in order to get the studs 22 in their recesses the plates 21 may be forced inwardly towards each other manually, which is permitted by the springiness inherent in the square formation formed by the upright 20 and cross members 25. This inherent springiness tends to force the upright 20 outwardly so that the studs fit in the recesses 16.

The frame also includes longitudinally extending members 30 each of which, as shown in Figs. 9 and 10, is composed of two parts hinged together by means of an intermediate member 31. Each of the two parts is bifurcated as shown with the member 31 disposed between the bifurcations with pivot pins 32 extending therethrough. The bifurcations are cut angularly thus having an angularly disposed bottom 33 and the ends of the intermediate member 31 are similarly angularly disposed as at 34. Accordingly, this hinge construction can break in one direction but is stiff in the opposite direction in the nature of an elbow joint. Thus the longitudinal members can hinge inwardly as shown in Fig. 2 and when the two parts of the longitudinal members are in alignment they may be held in such alignment by sleeves 35 which may be placed over the pivotal connection as shown in Fig. 9.

One end of each longitudinal member 30 has a ball and socket type connection with the corner piece 27 and for this purpose each member 30 may have a ball shaped end 36 and one part of the channel shaped member 27 may have a slot 37 to permit the passage of a small portion of the member 30 next adjacent the ball. The opposite wall and the channel shaped member 27 may be flanged inwardly as at 38 and the ball may be snapped past this flange so that it is retained in position independently thereby.

The forward ends of the longitudinal members are adapted to be attached to the closure 1 and for this purpose the ends may be turned downwardly as at 40 and placed in the eyes 11 as shown in Fig. 2.

This constitutes the entire frame structure. It may be folded up by removing the portions 30 from the ball and socket connection and disconnecting the members 40 from the closure 1 and then folding these members centrally on their pivotal connection. The end frame structure may be folded up for storage by separating the two parts of the cross piece 25 and folding each as regards its upright 20. By utilizing the word "storage" it is meant that the parts may be stored or placed in a suitable compartment in the automobile for use whenever desired. To set up the frame structure, the cross pieces 25 are correctly positioned as regard their upright and then the frame is sprung to permit the studs 22 to snap into recess 16 whereupon the longitudinal members are connected by the ball and socket construction with this frame and the opposite ends connected with the eyes on the closure 1.

This frame structure supports a covering of canvas or the like, as shown in Fig. 1. This canvas cover consists essentially of a top portion 41 having on it inside a flap 42 provided with hooks 43 adapted to be connected with the loops 10. The extreme forward edge of the top preferably overlaps the body 1 slightly as shown at 44. The top has another flap 45 with hooks 46, several in number, for hooking over the cross piece 25. A back 27 may be integral with the top 41 and this is drawn down back of the back rest provided by the raised top of the deck and is secured by a suitable fastener 48, one on each side of the deck.

Wings or flaps 50 secured to the back 47 and consisting preferably of the same material as the back 47 extend forward slightly and the upper corner of each flap may be attached to the member 30 as by means of hook 51 and the bottom portion may be attached to the deck by a suitable fastener as at 52.

It will therefore be seen that an occupant in the compartment 3 may very easily set up this frame and put the same in place, and then take the canvas cover and attach the forward edge to the loops 10 and lift the same over the cross pieces 25 and make the attachments as at 48. The flaps 50 may then be attached as at 51 and 52. This is done while the longitudinal members 30 are slightly collapsed as shown in Fig. 2. Thus the cover is rather loose to permit of ease in making the fastening. After this is done the occupant forcibly straightens out the members 30 which forces back the rear frame work, the same pivoting on bolt 33 thus causing the canvas to become taut whereupon the sleeves 35 are placed over the elbow joint holding the members 30 straight.

Preferably this closure is provided with a curtain 55 and 56 one on each side of the automobile. These curtains may be provided with a transparent opening 57. When it is desired to utilize the cover as a sun shade only the curtain 56 may be drawn in beneath the cover 41 and attached thereto by a row of fasteners 58. Then the curtain 55 may be lapped over curtain 56 and attached by a row of fasteners 59 to the top 41. These fasteners, as shown, may be of the conventional rotating head and grommet type and curtain 56 has suitable openings 60 for clearing the fasteners 59 for curtain 55. When the curtain is stored, these curtains are preferably in the position shown in Fig. 13 so that they are not in the way when the cover is set up as above described.

When it becomes necessary, however, to use the curtains for protection from the elements, they may be detached from the fasteners 58 and 59 and the lower edges secured to the deck as illustrated in Fig. 12. For this purpose each curtain may have a flap 61 provided with grommets for attachment to fasteners 14, the said forward edge of each curtain may overlap the body 1 slightly for securing thereto by suitable hooks engaging the loops 12 and 13.

It will be noted that the curtains can be put into use and folded up when not in use entirely by the occupants in the seat of the rear compartment. The forward edge of the curtains preferably slightly overlap the body 1 and accordingly it will be seen that they are folded up as illustrated in Fig. 13, the edge folds up slightly but this does not interfere with the folding of the curtains. The curtains, when in use are preferably also secured to the flap 50 by a number of fasteners 62.

It will be appreciated that the fastening devices may take various forms and while the said forward edge of the closure is connected to the body by hooks and loops different fastening device may be used although the hook and loop is thought to be advantageous for this purpose. The other fastening devices may advantageously take the form of a grommet and headed stud although here a spring acting snap fastener can be used.

The frame work as shown herein is constructed of members in the form of rods which are round in cross section. However, it will be understood that such members may be otherwise constructed, as for example, the nature of I-beams or tubes.

What I claim is:

1. For use with an automobile having a body with a fixed closure and a deck to the rear of the fixed closure, which deck is openable to afford an exposed passenger compartment, a collapsible closure for this passenger compartment comprising a frame structure consisting of upright members detachably connected to the automobile body near the rear of the compartment, a transverse cross member connecting the upper ends of the upright members, longitudinally extending members connecting the upright members with the fixed closure, a flexible cover secured at its forward edge to the fixed closure and supported at its rearward edge by the said transverse member, said longitudinally extending members being elbow jointed and adapted to be straightened out to effect tightening of the flexible cover, means for holding the jointed members in rigid non-bending relation, means pivotally connecting the forward end of the longitudinal members with the fixed closure, and a ball and socket construction for connecting the rear ends of the longitudinal members with the said upright members of the frame structure.

2. A collapsible top construction for a passenger compartment located in the rear deck of an automobile body provided with a relatively fixed closure forward of the deck, comprising in combination a pair of brackets carried by the rear deck, a rotatable supporting member on each bracket, an upright member adjustable lengthwise in and carried by each rotatable support, means for clamping the upright members in adjusted position, a transverse member carried by the upper ends of the upright members, longitudinal members connecting the upper ends of the upright members to the relatively fixed top, a flexible cover, means connecting the same to the relatively fixed top, means connecting the same to the transverse member, said cover extending downwardly from the transverse member, and means connecting the cover to the deck, a joint in each longitudinal member whereby the longitudinal members may be straightened out to tighten the flexible closure by shifting the upright members and rocking their rotatable supports.

In testimony whereof I affix my signature.

ELSA M. BARKER.